United States Patent
Topaltzas et al.

(10) Patent No.: US 8,699,959 B2
(45) Date of Patent: *Apr. 15, 2014

(54) MONITORING VOICE QUALITY IN COMMUNICATION NETWORKS

(75) Inventors: Dimitrios M. Topaltzas, Ellicott City, MD (US); Jeffrey Horner, Leesburg, VA (US)

(73) Assignee: Spirent Communications, Inc., Sunnyvale, CA (US)

(*) Notice: Subject to any disclaimer, the term of this patent is extended or adjusted under 35 U.S.C. 154(b) by 388 days.

This patent is subject to a terminal disclaimer.

(21) Appl. No.: 12/784,786

(22) Filed: May 21, 2010

(65) Prior Publication Data

US 2011/0130136 A1 Jun. 2, 2011

Related U.S. Application Data

(63) Continuation of application No. 11/457,655, filed on Jul. 14, 2006, now Pat. No. 7,756,484.

(51) Int. Cl.
    *H01B 17/00* (2006.01)
(52) U.S. Cl.
    USPC ............ 455/67.14; 455/423; 455/187.1; 455/67.11; 455/115.1; 455/115.2; 455/424; 455/425; 370/251; 379/10.01; 379/10.02; 379/12; 379/26.01; 379/27.01; 379/27.02; 379/27.03; 379/27.04
(58) Field of Classification Search
    USPC ............ 455/423, 187.1, 67.14, 67.11, 115.1, 455/115.2, 424, 425; 370/251; 379/10.01, 379/10.02, 12, 26.01, 27.01, 27.02, 27.03, 379/27.04
    See application file for complete search history.

(56) References Cited

U.S. PATENT DOCUMENTS

| | | | |
|---|---|---|---|
| 5,987,320 A * | 11/1999 | Bobick | 455/423 |
| 6,169,896 B1 * | 1/2001 | Sant et al. | 455/424 |
| 7,218,895 B1 * | 5/2007 | Raghavan | 455/67.13 |
| 7,257,182 B1 * | 8/2007 | Elliott et al. | 375/365 |
| 2001/0034225 A1 * | 10/2001 | Gupte et al. | 455/412 |
| 2005/0287954 A1 * | 12/2005 | Lim et al. | 455/67.11 |
| 2009/0170518 A1 * | 7/2009 | Jagadeesan et al. | 455/436 |
| 2009/0179988 A1 * | 7/2009 | Reibel et al. | 348/143 |

* cited by examiner

*Primary Examiner* — Justin Lee
(74) *Attorney, Agent, or Firm* — Haynes Beffel & Wolfeld LLP; Ernest J. Beffel, Jr.

(57) ABSTRACT

A method for monitoring voice quality in a communication network. In a first embodiment, the method comprises the steps of: establishing a voice communication pathway (VCPW) between first and second telephone terminals; establishing speech cadence between first and second terminals, wherein the terminals alternate between opposing send and listen/receive modes such that when one of the terminals is sending a voice test message the other terminal is either listening for or receiving the voice test message and vice versa; and calculating a voice quality score for one or more received voice test messages. In a second embodiment, synchronous cadence is established between a plurality of telephone terminals and a voice recognition server (VRS).

20 Claims, 8 Drawing Sheets

MONITORING VOICE QUALITY IN COMMUNICATION NETWORKS

CROSS-REFERENCE TO RELATED APPLICATIONS

This application claims priority to, and is a continuation of, U.S. application Ser. No. 11/457,655, filed Jul. 14, 2006, now U.S. Pat. No. 7,756,484, which is hereby incorporated by reference in its entirety for all purposes.

FIELD OF THE INVENTION

This invention relates to telecommunication systems and more particularly to a method and system for monitoring voice quality based on established speech cadence over one or more voice communication pathways.

BACKGROUND OF THE INVENTION

Voice quality on wireless communication systems is an issue for both service users and wireless service providers. While voice quality is a known variable for the caller and callee (i.e., the recipient of the call), the issue of monitoring voice quality in real time is more complicated for service providers. There remains a need for faster and more efficient ways of monitoring voice quality over wireless networks.

U.S. Pat. No. 6,700,953, issued to Maurer et al., describes a system for evaluating the quality of a transmission channel utilizing voice recognition technology that provides an accurate practical tool that measures voice quality in real-time and records audio for later examination. The system measures both the uplink audio (mobile to landline) and downlink audio (landline to mobile). Each of the voice quality scores is tagged with a time/date stamp. The Maurer et al. system uses a resolution of 1 millisecond. This can be used to correlate with data from a global positioning system (GPS) to plot the voice quality scores on a map, thus allowing an engineer to see where the voice quality degrades, to plot coverage maps, etc.

U.S. Pat. No. 6,169,896, issued to Sant et al., describes a system for directly comparing on a service quality basis a plurality of wireless network services that includes a vehicle containing a plurality of phones for different wireless networks and a fixed location for receiving calls from or transmitting calls to the vehicle. A call is initiated at the vehicle or fixed location, and a series of pre-selected messages are alternately transmitted between the vehicle and the fixed end through each of the networks with each message being quality graded with voice recognition software or data comparison techniques so that quality grades for each network are provided which can be combined and compared in various ways. The vehicle also includes a global positioning satellite system so that the vehicle location and speed can be tagged to each transmitted message to compare the relative quality of the networks within specific portions of the geographical area covered by the vehicle.

U.S. Patent Application Publication No. 20020131604, published to Amine, describes a system for measuring, analyzing, and improving voice quality, reliability, and interoperability of packet-based voice communication systems. The system measures quality of speech, analyzes DTMF and other telephony signaling, or captures line events at a remote location and communicating that information over computer networks. The system can include two or more testers, positioned at different geographic locations, for the purpose of monitoring the quality of speech and other communication parameters on voice-based computer networks. The invention relates to a system and method for generating one or more calls over different networks and deriving relative performance data from these calls. The user can compare the quality of service (speech quality, distortion, delays, jitter, echo, glitches, noise, etc.) between these networks under test. Each network may be a VON, a PSTN, or a hybrid VON-PSTN.

U.S. Patent Application Publication No. US 20030134631, issued to Snyder et al., describes a system with one or more communication devices within a communication network that are provided with a dynamically and remotely configurable probe element, implemented at least partially in software and controllable by the network operator via one or more communication links, capable of monitoring, measuring and capturing user interaction data flowing from voice and/or data transactions occurring in the network. User interaction data reflects a user's experience on the network and thus provides valuable raw data usable by the network operator for improving network quality from the user's perspective, especially when received from a statistically significant number of network user devices. Collected user interaction data can include network engineering metric data and/or user profile data.

U.S. Pat. No. 6,330,428, issued Dec. 11, 2001 to Lewis et al., describes a voice quality performance evaluator. The '428 evaluator includes an interface, memory, processing circuitry and may include a network interface. The interface is adapted to couple to a voice transmission path under test. The memory couples to the interface and is adapted to store an original voice sample and a modified voice sample. The processing circuitry couples to the interface and to the memory, retrieves the original voice sample from the memory and transmits the original voice sample to the voice transmission path under test via the interface. The processing circuitry also receives the modified voice sample via the interface from the voice transmission path under test. The processing circuitry compares the original voice sample to the modified voice sample in the frequency domain to evaluate the performance of the voice transmission path.

U.S. Pat. No. 5,987,320, issued Nov. 16, 1999 to Bobick et al., describes a voice quality testing apparatus and method. The '320 system, if implemented, includes a receiving and transmitting apparatus at both ends of the system. To evaluate voice quality, one apparatus transmits a TDM base band voice test signal to a receiving apparatus. The configuration of the transmitted TDM base band voice test signal permits the receiving end to synchronize a test sentence, contained within the TDM test signal, with a corresponding reference sentence stored at the receiving apparatus. After synchronization, the receiving apparatus uses a model of human hearing to objectively compare the two sentences, and based on the result, outputs an AQS ranking. In addition to voice quality, the apparatus measures SINAD, noise, distortion, and signal level of transmitted test tones and maintains a log of call progress statistics.

U.S. Patent Publication No. 20030069011, published Apr. 10, 2003 to Bonnifait et al., describes a voice quality of telephone calls in which a first connection is established between a computerized apparatus and a person acting as a first experimenter, and a second connection is established between the platform and a second experimenter. The first and second connections are interconnected by the computerized apparatus to establish a call between the two experimenters and enable them to converse, the apparatus being cut into the call in order to acquire data about the call. The experimenters' opinions are solicited concerning their perceptions of the quality level they observe during their conversation. The apparatus evaluates consistency of the data collected with the nominal experimental conditions and the nominal quality level associated with the current test. Then, a determination is made on how the current test should be carried out as a function of a test plan and the result of the evaluation. The test plan is set up by specifying nominal conditions for the experiment and nominal quality levels for carrying out the tests, and in collecting data during the tests.

U.S. Patent Publication No. 20050015253, published Jan. 20, 2005 to Rambo et al., describes methods and systems of analyzing, assessing, and reporting voice quality scores. In one embodiment, voice quality scores are generated by querying one or more computing devices responsible for processing a reference speech sample input into a voice communication system.

SUMMARY OF THE INVENTION

A method and system for monitoring voice quality in communication networks such as, but not limited to, a wireless network.

In a first embodiment, the invention is directed to a method for monitoring voice quality in a communication network, including the steps of: establishing a voice communication pathway between first and second telephone terminals; establishing speech cadence between first and second terminals, wherein the terminals alternate between opposing send and listen/receive modes such that when one of the terminals is sending a voice test message the other terminal is either listening for or receiving the voice test message and vice versa; and calculating a voice quality score for one or more received voice test messages.

In a second embodiment, a method is provided for monitoring voice quality in a communication network, including the steps of: establishing voice communication pathways between a plurality of telephone terminals and a voice recognition server (VRS); establishing speech cadence between the plurality of telephone terminals and the VRS, wherein voice test messages are alternately sent and received in synchrony between the plurality of telephone terminals and the VRS; and calculating a voice quality score for one or more received voice test messages.

DETAILED DESCRIPTION OF THE INVENTION

This invention is directed to telecommunication systems and more particularly to a method and system for monitoring voice quality based on establishing speech cadence established over one or more voice communication pathways.

In a first embodiment, the invention is directed to a method for monitoring voice quality in a communication network, comprising the steps of: establishing a voice communication pathway (VCPW) between first and second telephone terminals; establishing speech cadence between first and second terminals, wherein the terminals switch between opposing send and listen/receive modes such that when one of the terminals is sending a voice test message over the VCPW the other terminal is either listening for or receiving the voice test message and vice versa; storing one or more received voice test messages in a suitable format (such as, but not limited to, WAV format) and/or calculating a voice quality score for one or more received voice test messages.

In a second embodiment, the invention is directed to a method for remotely monitoring voice quality across a plurality of voice communication pathways (VCPWs), comprising the steps of: establishing a plurality of voice communication pathways between a voice recognition server (VRS) and a plurality of telephone terminals (such as, but not limited to, a plurality of mobile terminals MT#1 . . . MT#N); establishing speech cadence between the VRS and the plurality of telephone terminals; converting one or more of the voice test messages received by the VRS into digital files such as, but not limited to, WAV files; forwarding one or more of the digital files to a remote computer for calculating a voice quality scores. It should be understood that the terms "received voice test message", "received VTM", "modified voice test message" and "received MVTM" are equivalent terms that refer to a received voice test message.

Any suitable method can be employed to calculate voice quality scores such as, but not limited to, the industry standard MOS equivalent score. A MOS equivalent score can be obtained by comparing the difference between the received VTM and the corresponding reference (i.e., original) voice test message (VTM) to produce an error signal, which can be normalized using known MOS score data for a given network to provide a MOS equivalent score as described, for example, in U.S. Pat. No. 6,330,428. Alternatively, voice quality scoring based on voice recognition in combination with a voice quality measurement application as described in U.S. Pat. No. 6,700,953; U.S. Pat. No. 6,700,953 is incorporated by reference herein in its entirety.

One or more of the voice quality scores can be directed to a remote computer. Alternatively, one or more modified voice test messages (MVTMs, i.e., received voice test messages) can be converted into any standard format such as, but not limited to, WAV format files. The WAV files can be directed to a remote computer for display or further processing to generate objective voice quality scores. For example, MVTMs can be converted to WAV files and directed to one or more remote computers via the Internet using, for example, http or https (combination of a normal http interaction over an encrypted secure socket layer (SSL) or transport layer security (TLS)). Thus, remote computers can perform voice quality (VQ) scoring in real time on any VCPW of interest. In addition, an operator is permitted to to listen to received VTMs by means of D/A conversion to subjectively monitor VCPWs of interest.

With respect to the first embodiment, speech cadence can be established between any suitable telephone terminals such as part number 250 in U.S. Pat. No. 6,330,428 (Lewis et al); U.S. Pat. No. 6,330,428 is incorporated herein by reference in its entirety. The voice terminal may comprise a network interface, standard terminal circuitry, a voice coder and a voice decoder as described in the U.S. Pat. No. 6,330,428; such devices typically include an accurate clock. Voice messages can be sent, for example, over a voice communication pathway (VCPW) between a first mobile terminal (MT#1) and a second mobile terminal (MT#2).

Still referring to the first embodiment, speech cadence is established between MT#1 and MT#2; however, MT#1 and/or MT#2 can be replaced with any other telephony device such as a regular fixed telephone linked to a public switching telephone network (PSTN) or an integrated services digital network (ISDN). It should be understood that the examples used to describe the first embodiment are not intended to limit the setup at either end of the voice communication pathway (VCPW) under test. Either end of the voice communication pathway under test can take the form of a fixed end and/or a mobile end.

Figure 1:
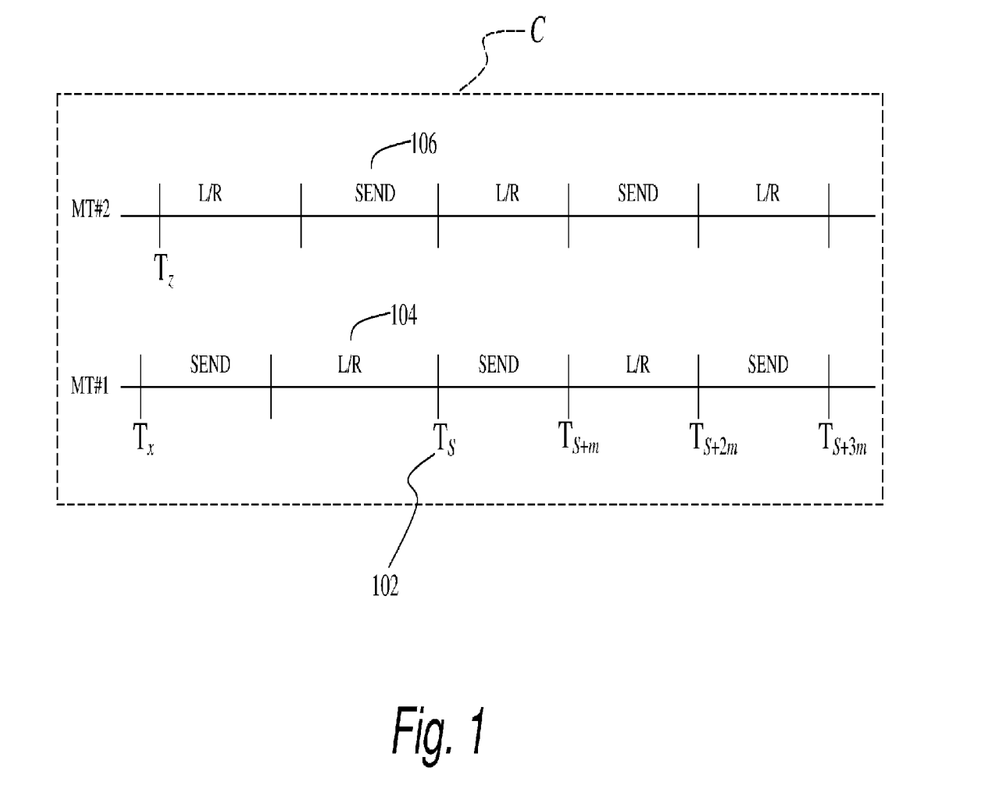
FIG. 1 is a schematic that shows how cadence C is achieved following establishment of a voice communication pathway (VCPW) between first and second mobile terminals MT#1 and MT#1 according to the first embodiment of the invention.

In accordance with the first embodiment of the invention, speech cadence is typically established over a voice communication pathway (VCPW) in one cycle of SEND and LISTEN/RECEIVE ("L/R") as shown in FIG. 1. A first telephone terminal MT#1 is initially set to SEND mode and a second telephone terminal MT#2 at the other end of the VCPW under test is set in L/R (LISTEN/RECEIVE mode). Thus, the second terminal can be left in L/R to receive a voice test message (VTM) from the first terminal (see FIG. 3 and accompanying description below).

Figure 2:
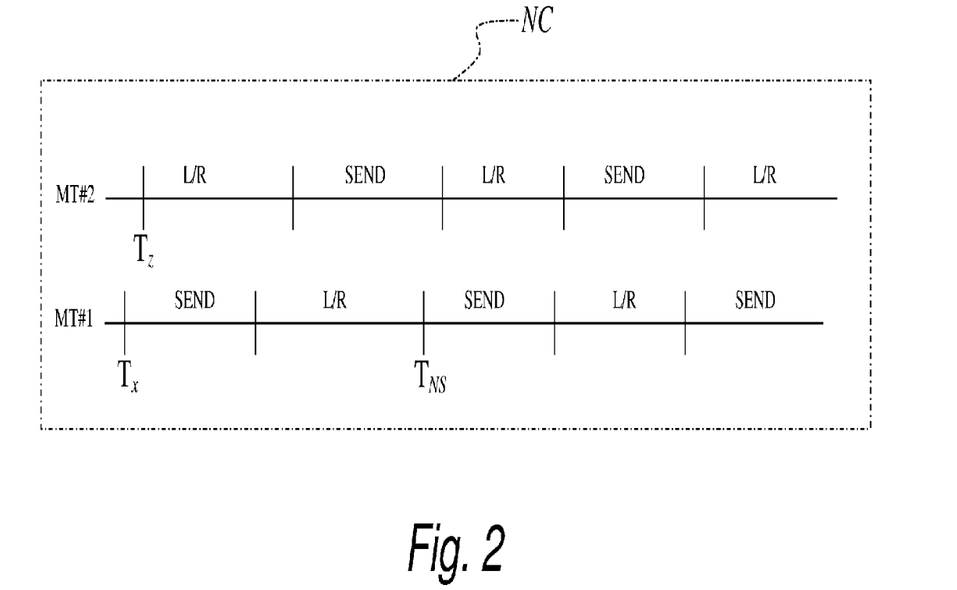
FIG. 2 shows the situation where MT#1 and MT#2 do not establish cadence.

FIG. 1 shows how cadence C is achieved following establishment of a VCPW between first and second mobile terminals MT#1 and MT#1 according to the first embodiment of the invention. MT#1 and MT#2 achieve synchronized cadence within one complete cycle of L/R and SEND modes. In this example, MT#1 listened to MT#1's speech and adjusted its clock at 102 to be in synchronized cadence with MT#1. More specifically, MT#2 stretched its first L/R period 104 to synchronous time point $T_S$ at 102, where $T_S$ represents the end of MT#1's first SEND period 106. The subscript "S" in $T_S$ represents synchrony between MT#1 and MT#2. By way of contrast, FIG. 2 shows the situation where MT#1 and MT#2 are not directed to establish cadence (represented by labels no-cadence, "NC" and lack of synchrony $T_{NS}$).

Figure 3:
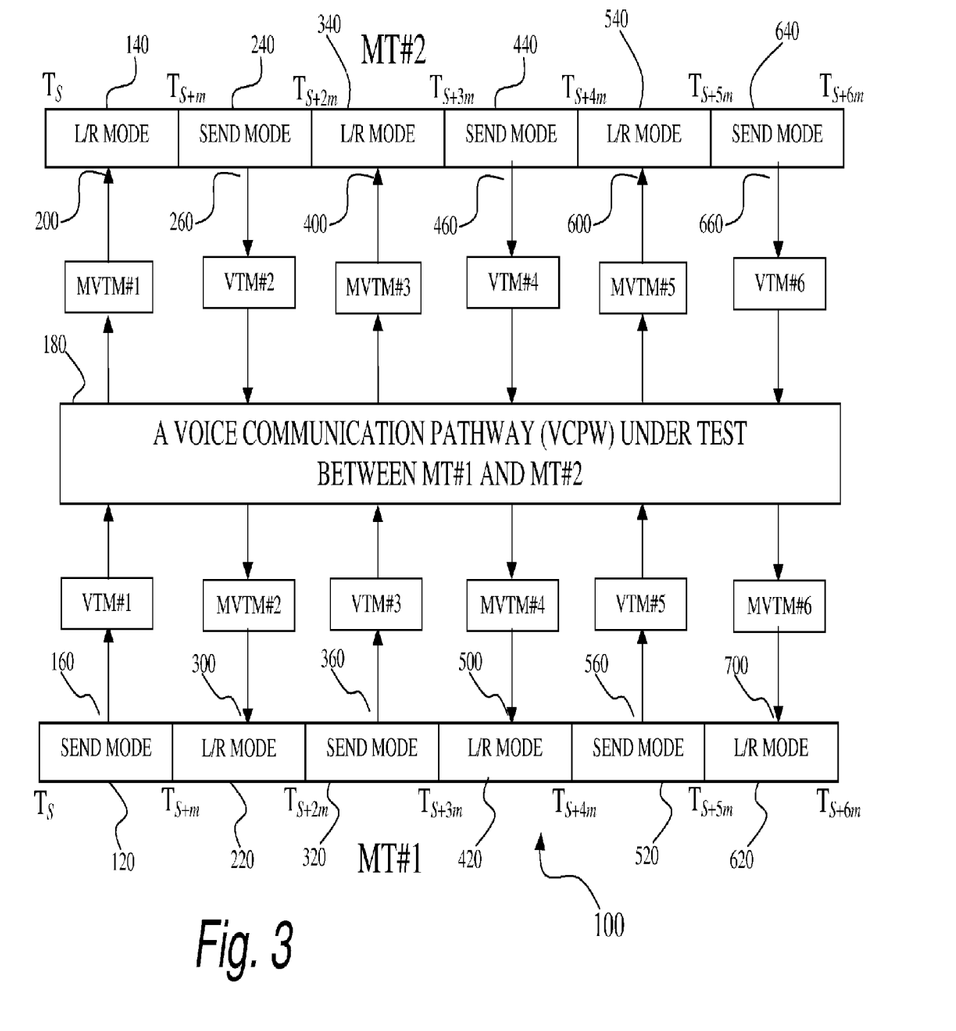
FIG. 3 shows how cadence is used to alternately send and receive voice test messages (VTMs) in synchrony between MT#1 and MT#2 according to the first embodiment of the invention.

Referring to FIG. 3, once cadence has been achieved voice test messages are sent and received alternately in synchrony between MT#1 and MT#2. In this illustration, speech cadence is continued between MT#1 and MT#2 as follows: at $T_S$ MT#1 is set to SEND mode at 120, and MT#2 is set to L/R mode at 140. At some point between $T_S$ and $T_{S+m}$, MT#1 transmits a voice test message #1 (VTM#1) at 160 through a voice communication pathway (VCPW) in communication network 180, and MT#2 receives VTM#1 as modified voice test message #1 (MVTM#1) at 200. VTMs are original voice test messages and MVTMs are VTMs that have passed through a communication network under test or more particularly a voice communication pathway under test.

Still referring to FIG. 3, between $T_{S+m}$ and $T_{S+2m}$, mobile terminals MT#1 and MT#2 are reset to L/R AND SEND modes at 220 and 240, respectively. MT#2 transmits a voice test message #2 (VTM#2) at 260 through communication network 180. MT#1 receives VTM#2 as modified voice test message #2 (MVTM#2) at 300.

Still referring to FIG. 3, between $T_{S+2m}$ and $T_{S+3m}$ mobile terminals MT#1 and MT#2 are reset to SEND AND L/R modes at 320 and 340, respectively. MT#1 transmits a voice test message #3 (VTM#3) at 360 through communication network 180. MT#2 receives VTM#3 as modified voice test message #3 (MVTM#3) at 400.

Still referring to FIG. 3, between $T_{S+3m}$ and $T_{S+4m}$, mobile terminals MT#1 and MT#2 are reset to L/R and SEND modes at 420 and 440, respectively. MT#2 transmits a voice test message #4 (VTM#4) at 460 through communication network 180. MT#1 receives VTM#4 as modified voice test message #4 (MVTM#4) at 500.

Still referring to FIG. 3, between $T_{S+4m}$ and $T_{S+5m}$, mobile terminals MT#1 and MT#2 are reset to SEND and L/R modes at 520 and 540, respectively. MT#1 transmits a voice test message #5 (VTM#5) at 560 through communication network 180. MT#2 receives VTM#5 as modified voice test message #5 (MVTM#5) at 600.

Still referring to FIG. 3, between $T_{S+5m}$ and $T_{S+6m}$, mobile terminals MT#1 and MT#2 are reset L/R and SEND modes at 620 and 640, respectively. MT#2 transmits a voice test message #6 (VTM#6) at 660 through communication network 180. MT#1 receives VTM#6 as modified voice test message #6 (MVTM#6) at 700.

The alternating synchronous cycles of SEND and L/R modes can continue to provide real time monitoring of VCPW 180. More specifically, if a voice quality test unit (VQTU, see FIG. 4 and description below) is operably coupled to MT#1 and/or MT#2 then voice quality scores can be generated upon receipt of each MVTM, i.e., a VQTU attached to MT#1 would be able to evaluate the voice quality of the communication pathway between MT#2 and MT#1. Conversely, a VQTU attached to MT#2 would be able to evaluate the voice quality of the communication pathway between MT#1 and MT#2.

Any suitable voice quality test unit (VQTU) (shown in FIG. 4 as members 880 and 900) can be used such as, but not limited to, that described in U.S. Pat. No. 6,330,428 in which an example of a voice quality test unit is described in terms of a voice quality performance evaluator (VQPE). U.S. Pat. No. 6,330,428 is incorporated herein by reference in its entirety.

Figure 4:
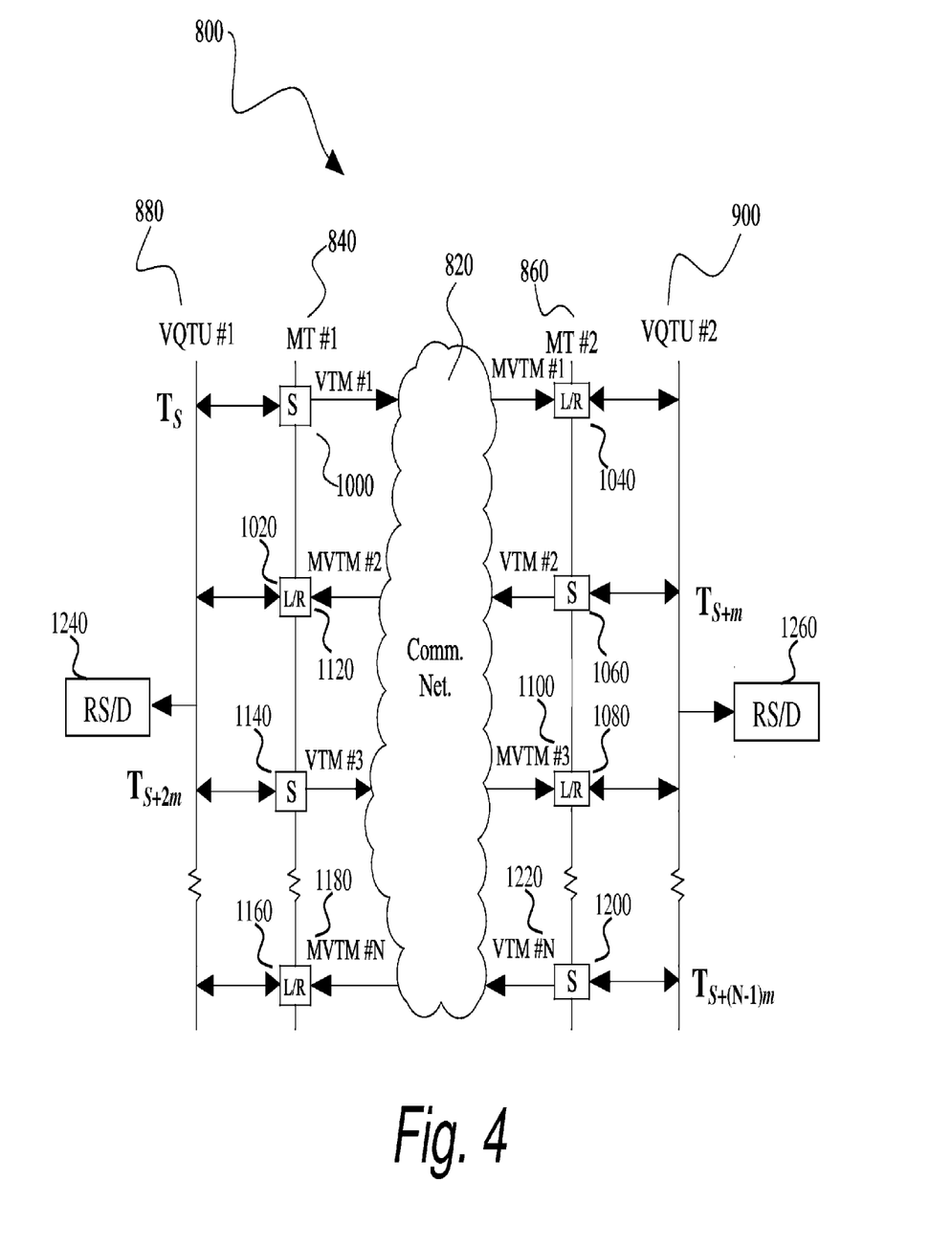
FIG. 4 shows an interaction diagram illustrating the interaction across a communication network during cadence between MT#1 and MT#2 according to the first embodiment of the invention.

Referring to FIG. 4, which is an interaction diagram 800 illustrating the interaction across a communication network 820 during cadence between a first mobile terminal (MT#1) at 840 and a second mobile terminal (MT#2) at 860. MT#1 and MT#2 are respectively adapted to receive and process instructions from voice quality test units VQTU#1 and VQTU#2. Hence, MT#1 and MT#2 are shown operably coupled to VQTU#1 at 880 and VQTU#2 at 900, respectively. VQTU#1 and/or VQTU#2 could take the form of a laptop computer or personal computer upon which software to set up speech cadence and application software to conduct voice quality evaluations is pre-loaded and in executable form.

Still referring to FIG. 4, VQTU#1 at 880 instructs MT#1 at 1000 to initialize to SEND (S) mode and send a first voice test message (VTM#1) to the second mobile terminal MT#2 at time $T_0$. Upon sending VTM#1, VQTU#1 instructs MT#1 at 1020 to switch to L/R mode in anticipation of receiving VTM#2 (as MVTM#2) from MT#2.

Still referring to FIG. 4, at $T_0$ or at some point prior to $T_0$, the second voice quality test unit VQTU#2 instructs MT#2 to switch to L/R mode at 1040 to receive VTM#1, which is received as MVTM#1 (modified voice test message #1, i.e., VTM#1 after transmission through network 820). Upon receiving MVTM#1, VQTU#2 instructs MT#2 to switch to SEND ("S") mode and send VTM#2 to MT#1 at 1060. Immediately after sending VTM#2, VQTU#2 instructs MT#2 to switch to L/R mode at 1080 in anticipation of receiving MVTM#3 at 1100. Upon receiving MVTM#3, VQTU#2 instructs MT#2 to switch to send mode at 1200 and transmit VTM#N at 1220. At any convenient juncture, VQTU#1 and/or VQTU#2 can compute voice quality scores based on received MVTMs (modified voice test messages) and direct such scores to remove remote displays and/or servers at 1240 and 1260, respectively, for display and/or statistical analysis.

Still referring to FIG. 4, VTM#2 is received as MVTM#2 by MT#1 at 1120. Upon receiving MVTM#2, VQTU#1 instructs MT#1 to switch to SEND ("S") mode and send VTM#3 to MT#2 at 1140. Immediately after sending VTM#3, VQTU#1 instructs MT#1 to switch to L/R mode at 1160 in anticipation of receiving MVTM#N at 1180.

The invention is also amenable to objective voice quality scoring based on a voice recognition application in combination with a quality measurement application as described in U.S. Pat. No. 6,700,953; U.S. Pat. No. 6,700,953 is incorporated by reference herein in its entirety. Voice recognition application in combination with a quality measurement application can be used to obtain objective voice quality scoring upon receipt of each MVTM at one or both ends of the voice communication pathway channel under test. For example, MVTMs received during cadence at both ends of the voice communication pathway may be converted to a digital signal, and compared to corresponding reference phrases to generate objective voice quality scores, which can be directed to a remote server for display and/or further statistical processing.

Figure 5:
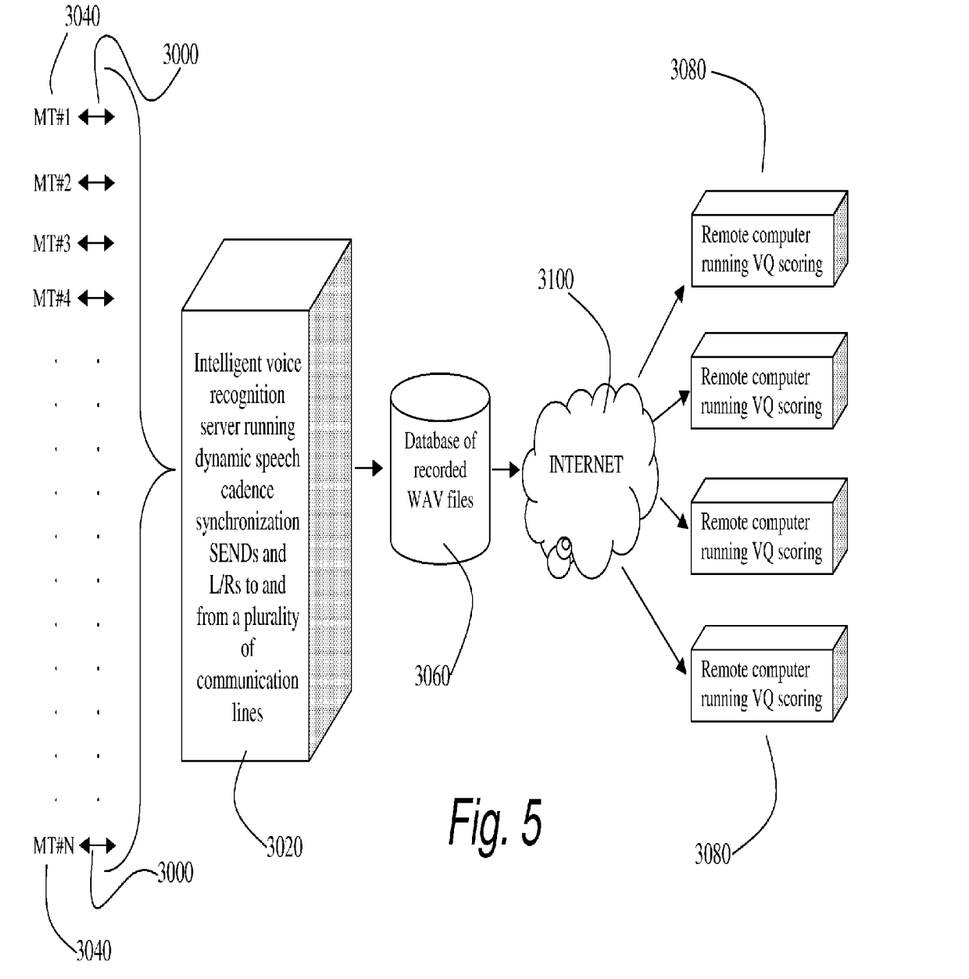
FIG. 5 is a schematic illustrating the remote monitoring of voice quality across a plurality of VCPWs according to the second embodiment of the invention.

Referring to FIG. 5, which speaks to the second embodiment of the invention, a method is provided for remotely monitoring voice quality across a plurality of VCPWs (represented as arrows 3000 in FIG. 5). A plurality of VCPWs 3000 is established between a voice recognition server (VRS) 3020 and a plurality of telephone terminals 3040, which are shown in FIG. 5 as a plurality of mobile terminals MT#1 . . . MT#N. It should be understood that the plurality of telephone terminals 3040 might be a mix of mobile terminals and fixed telephones.

The second embodiment lends itself to scalability. For example, the VRS 3020 can take the form of separate processors operating in parallel to handle greater numbers of incoming VTMs from greater and greater number of MTs 3040. For example, a VRS capable of communicating simultaneously with 100 MTs could be coupled to a further VRS capable of communicating simultaneously with another 100 MTs to provide VRS functionality able to communicate with up to 200 MTs.

One or more of the voice test messages received by the VRS are converted into WAV files, which are stored on a database 3060. The WAV files are accessible by one or more remote computers 3080 via the Internet 3100. Voice quality (VQ) algorithms are loaded on one or more of the remote computers to perform VQ scoring. The terms "plurality of VCPWs" and "plurality of communication lines" are regarded as equivalent terms.

Figure 6:
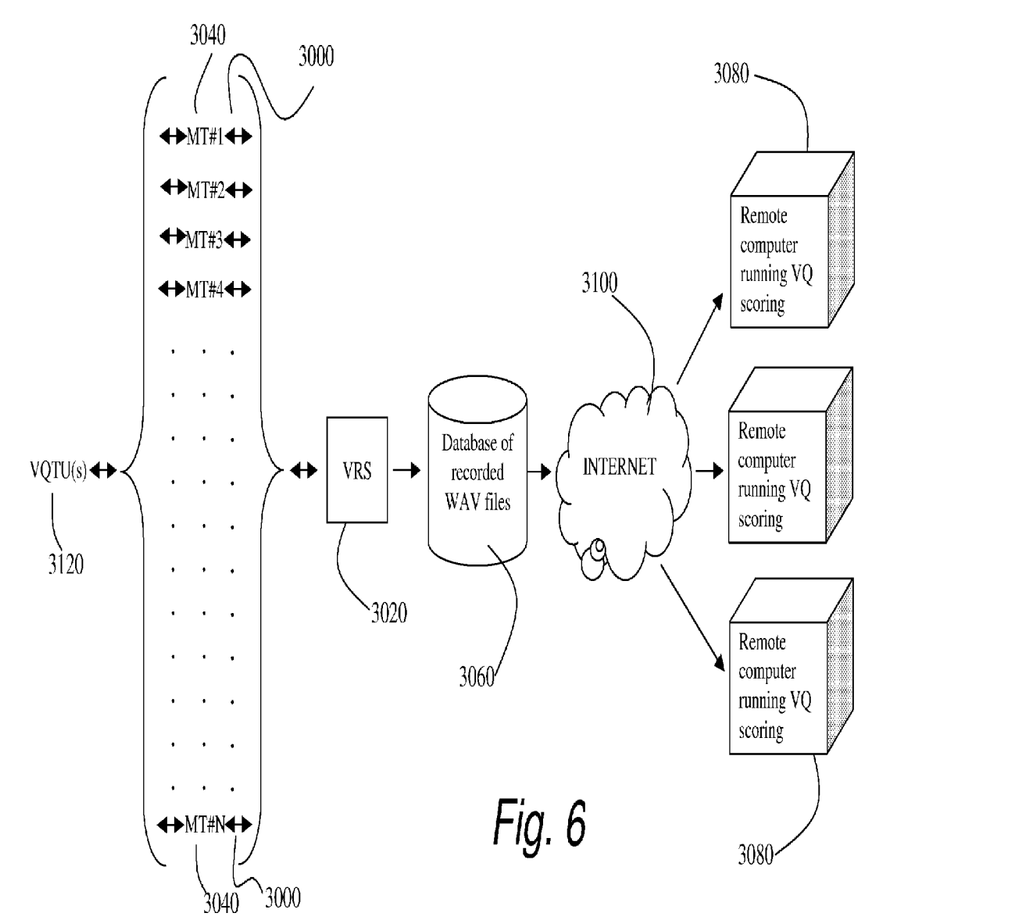
FIG. 6 illustrates a variation of the second embodiment shown in FIG. 5.

In a variation of the second embodiment (see FIG. 6), one or more of the telephone terminals 3040 are operably linked to one or more voice quality test units VQTU(s) 3120 thereby allowing voice test messages received by the telephone terminals 3040 to be scored for voice quality.

Figure 7:
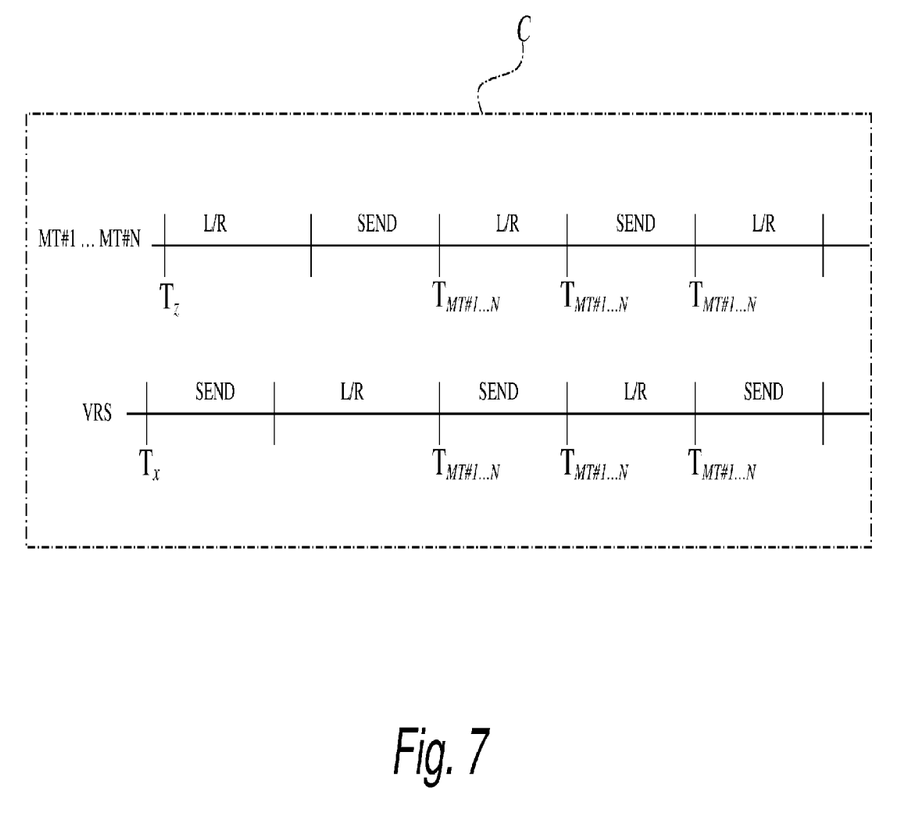
FIG. 7 illustrates a non-limiting example of how cadence is achieved between a plurality of telephone terminals and a voice recognition server (VRS).

Cadence between the VRS 3020 and the plurality of telephone terminals 3040 can be established in a variety of ways. In FIG. 7, the VRS runs a number of virtual clocks which allows the VRS to adjust itself and establish cadence with every MT operably linked to the VRS.

Figure 8:
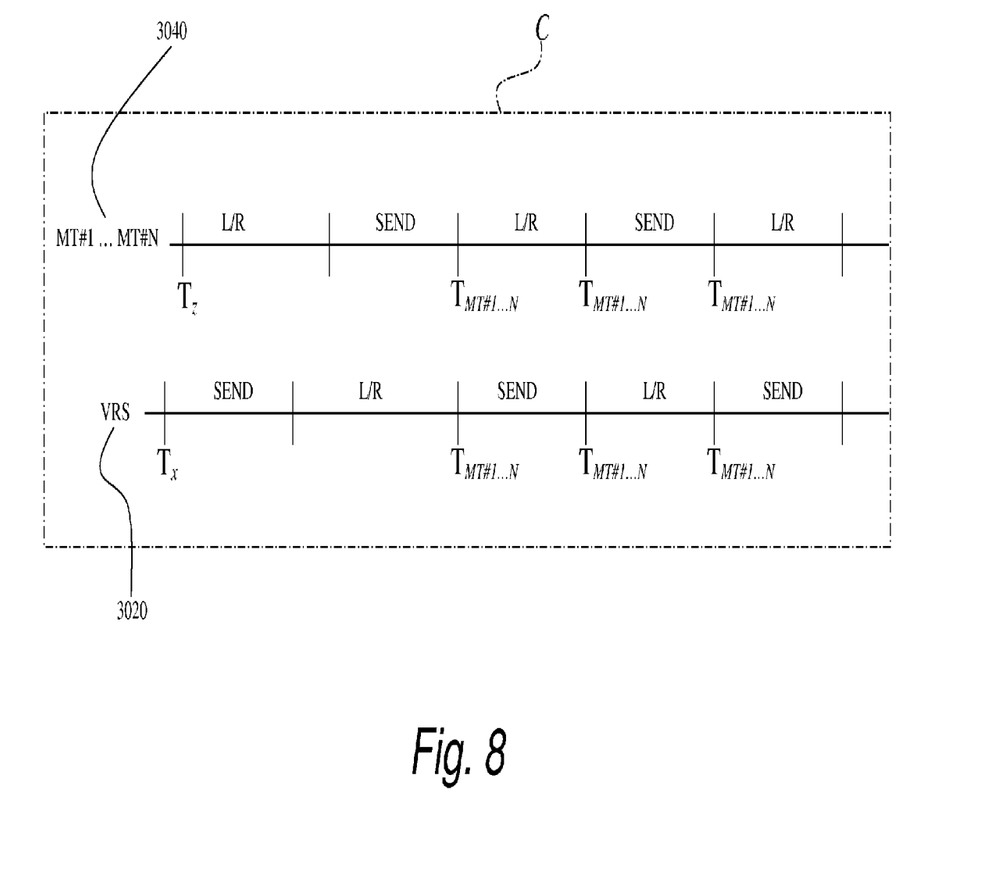
FIG. 8 shows another non-limiting example of how cadence is achieved between a plurality of telephone terminals and a VRS.

Cadence between the VRS 3020 and the plurality of telephone terminals 3040 can be established in a variety of ways. In FIG. 8, each MT individually adjusts its internal clock to achieve cadence with the VRS 3020.

The second embodiment of the invention provides a method for voice quality scoring (i.e., voice quality monitoring) in a communication network, comprising the steps of: establishing voice communication pathways between a plurality of telephone terminals and a voice recognition server (VRS); establishing speech cadence between the plurality of telephone terminals and the VRS, wherein voice test messages are alternately sent and received in synchrony between the plurality of telephone terminals and the VRS; and calculating a voice quality score for one or more received voice test messages.

Moreover, the invention is particularly suited for providing an objective measurement, in real-time, of voice quality transmitted over a voice communication pathway (i.e. a voice communication pathway channel across one or more telecom communication networks). The applicant is unaware of any other system or method that provides objective voice quality scores in real-time in both directions along a voice communication pathway.

It is to be understood that the present invention is not limited to the embodiments described above, but encompasses any and all embodiments within the scope of the following claims.

What is claimed is:

1. A method for monitoring voice quality in a communication network, comprising:
   establishing a first voice communication pathway between a first mobile telephone and a voice server via the communication network;
   concurrently with said establishing the first voice communication pathway between the first mobile telephone and the voice server, establishing a second communication pathway between a second mobile telephone and the voice server via the communication network;
   wherein each of the first and second mobile telephones and the voice server operate in a first mode of operation in which either one of the first or second mobile telephones transmits a first voice test message via the communication network and the voice server is configured to receive the first voice test message;
   wherein each of the first and second mobile telephones and the voice server operate in a second mode of operation in which the voice server transmits a second voice test message via the communication network and either one of the first or second mobile telephones is configured to receive the second voice test message;
   establishing synchronicity between the first mobile telephone and the voice server to repeatedly alternate between the first mode of operation and the second mode of operation by triggering an initial message in an initial mode of operation, which can be the first or second mode of operation, wherein said establishing synchronicity between the first mobile telephone and the voice server comprising listening to at least part of the initial message, and continuing listening for a period of time after the end of the initial message;
   concurrently with establishing synchronicity between the first mobile telephone and the voice server, establishing synchronicity between the second mobile telephone and the voice server to repeatedly alternate between the first mode of operation and the second mode of operation; and determining a voice quality for each of a plurality of first voice test messages received by the voice server.

2. The method according to claim 1, further comprising determining the voice quality for each of a plurality of second voice test messages received by the first mobile telephone and the second mobile telephone.

3. The method according to claim 1, wherein said establishing synchronicity between the first mobile telephone and the voice server comprises adjusting a virtual clock of the first mobile telephone to establish synchronicity between the first mobile telephone and the voice server.

4. The method according to claim 1, wherein said determining the voice quality for each of the plurality of received first voice test messages comprises converting each of the plurality of received first voice test messages to a digital representation, and wherein the digital representation is compared to a corresponding reference phrase to generate an objective voice quality score.

5. The method according to claim 1, further comprising prior to said determining the voice quality for each of the plurality of received first voice test messages:
identifying a corresponding voice reference message for a first received first voice test message, and
synchronizing the first received first voice test message with the identified corresponding voice reference message to provide a pair of aligned test-reference messages.

6. The method according to claim 1, wherein the first voice communication pathway spans a mobile telephone network linked to a public switched network (PSTN), and wherein the first mobile telephone is in communication with the mobile telephone network, and the voice server is communicatively coupled to the PSTN.

7. The method according to claim 1, further comprising converting one or more received voice test messages into WAV format files, and directing the WAV files to a remote computer.

8. The method according to claim 1, wherein said first mobile telephone is configured to establish synchronicity with the voice server based upon receipt of an initial voice test message from the voice server.

9. A method for monitoring voice quality in a communication network, comprising:
establishing a first voice communication pathway between a first mobile telephone and a voice server via the communication network;
concurrently with said establishing the first voice communication pathway between the first mobile telephone and the voice server, establishing a second communication pathway between a second mobile telephone and the voice server via the communication network;
wherein each of the first and second mobile telephones and the voice server operate in a first mode of operation in which the mobile telephone transmits a first voice test message via the communication network and the voice server is configured to receive the first voice test message;
wherein each of the first and second mobile telephones and the voice server operate in a second mode of operation in which the voice server transmits a second voice test message via the communication network and the mobile telephone is configured to receive the second voice test message;
establishing synchronicity between the first mobile telephone and the voice server to repeatedly alternate between the first mode of operation and the second mode of operation, wherein said establishing synchronicity between the first mobile telephone and the voice server comprises stretching a duration of an initial time period during which the first mobile telephone is configured to receive the second voice test message;
concurrently with establishing synchronicity between the first mobile telephone and the voice server, establishing synchronicity between the second mobile telephone and the voice server to repeatedly alternate between the first mode of operation and the second mode of operation; and
determining a voice quality for each of a plurality of first voice test messages received by the voice server.

10. A method for monitoring voice quality in a communication network, comprising:
concurrently establishing a plurality of voice communication pathways between a plurality of mobile telephones and a voice server via the communication network;
wherein in a first mode of operation for each of the plurality of mobile telephones, a particular mobile telephone transmits a first voice test message via the communication network and the voice server is configured to receive the first voice test message;
wherein in a second mode of operation for each of the plurality of mobile telephones, the voice server transmits a second voice test message and the particular mobile telephone is configured to receive the second voice test message via the communication network;
establishing synchronicity between each of the plurality of mobile telephones and the voice server to repeatedly alternate between the first mode of operation and the second mode of operation by triggering an initial message in an initial mode of operation, which can be the first or second mode of operation, wherein said establishing synchronicity between the first mobile telephone and the voice server comprising listening to at least part of the initial message, and continuing listening for a period of time after the end of the initial message;
wherein said establishing synchronicity comprises adjusting a virtual clock associated with each of said mobile telephones to establish synchronicity between each mobile telephone and the voice server;
determining a first voice quality score for each of a plurality of first voice test messages received by the voice server; and
determining a second voice quality score for each of a plurality of second voice test messages received by the plurality of mobile telephones.

11. The method according to claim 10, wherein a first mobile telephone is communicatively coupled to a voice quality test unit configured to determine the second voice quality score for the second voice test messages received by the first mobile telephone.

12. The method according to claim 10, wherein a first mobile telephone is configured to establish synchronicity with the voice server based upon receipt of an initial voice test message from the voice server.

13. The method according to claim 10, further comprising:
identifying a voice reference message corresponding to one received voice test message, and
synchronizing the one received voice test message with the identified voice reference message to provide a pair of aligned test-reference messages.

14. A method for monitoring voice quality in a communication network, comprising:
concurrently establishing a plurality of voice communication pathways between a plurality of mobile telephones and a voice server via the communication network;

wherein in a first mode of operation for each of the plurality of mobile telephones, the mobile telephone transmits a first voice test message via the communication network and the voice server is configured to receive the first voice test message;

wherein in a second mode of operation for each of the plurality of mobile telephones, the voice server transmits a second voice test message and the mobile telephone is configured to receive the second voice test message via the communication network;

establishing synchronicity between each of the plurality of mobile telephones and the voice server to repeatedly alternate between the first mode of operation and the second mode of operation wherein said establishing synchronicity further comprises stretching a duration of an initial time period during which at least some of the plurality of mobile telephones are configured to receive the second voice test message;

wherein said establishing synchronicity comprises adjusting a virtual clock associated with each of said mobile telephones to establish synchronicity between each mobile telephone and the voice server;

determining a first voice quality score for each of a plurality of first voice test messages received by the voice server; and determining a second voice quality score for each of a plurality of second voice test messages received by the plurality of mobile telephones.

15. A method for monitoring voice quality in a communication network, comprising:

communicatively coupling a voice quality test unit to a first mobile telephone;

establishing a voice communication pathway between the first mobile telephone and a telephone terminal via the communication network;

wherein in a first mode of operation the first mobile telephone sends a first voice test message via the communication network and the telephone terminal is configured to receive the first voice test message;

wherein in a second mode of operation the telephone terminal sends a second voice test message and the first mobile telephone is configured to receive the second voice test message via the communication network and to provide the received second voice test message to the voice quality test unit;

establishing synchronicity between the first mobile telephone and the telephone terminal to repeatedly alternate between the first mode of operation and the second mode of operation by triggering an initial message in an initial mode of operation, which can be the first or second mode of operation, wherein said establishing synchronicity between the first mobile telephone and the telephone terminal comprising listening to at least part of the initial message, and continuing listening for a period of time after the end of the initial message;

wherein said establishing synchronicity comprises adjusting a virtual clock associated of the first mobile telephone to establish synchronicity;

determining a first voice quality score for each of a plurality of first voice test messages received by the telephone terminal; and with the voice quality test unit, determining a second voice quality score for each of a plurality of second voice test messages received by the first mobile telephone.

16. The method according to claim 15, wherein the telephone terminal comprises a voice server configured to simultaneously communicate with a plurality of mobile telephones.

17. The method according to claim 15, wherein the telephone terminal comprises a voice server, the method further comprising:

concurrently with said establishing synchronicity between the first mobile telephone and the voice server, establishing synchronicity between the voice server and a second mobile telephone to repeatedly alternate between the first mode of operation and the second mode of operation to communicate voice test messages via the communication network; and determining a voice quality score for each of a plurality voice test messages received by the voice server from the second mobile telephone.

18. The method according to claim 15, further comprising:

identifying a voice reference message corresponding to one received voice test message, and synchronizing the one received voice test message with the identified voice reference message to provide a pair of aligned test-reference messages.

19. The method according to claim 15, wherein said first mobile telephone is configured to establish synchronicity with the telephone terminal based upon receipt of an initial voice test message from the telephone terminal.

20. A method for monitoring voice quality in a communication network, comprising:

communicatively coupling a voice quality test unit to a first mobile telephone;

establishing a voice communication pathway between the first mobile telephone and a telephone terminal via the communication network;

wherein in a first mode of operation the first mobile telephone sends a first voice test message via the communication network and the telephone terminal is configured to receive the first voice test message;

wherein in a second mode of operation the telephone terminal sends a second voice test message and the first mobile telephone is configured to receive the second voice test message via the communication network and to provide the received second voice test message to the voice quality test unit;

establishing synchronicity between the first mobile telephone and the telephone terminal to repeatedly alternate between the first mode of operation and the second mode of operation wherein said establishing synchronicity further comprises stretching a duration of an initial time period during which the first mobile telephone is configured to receive the second voice test message;

wherein said establishing synchronicity comprises adjusting a virtual clock associated of the first mobile telephone to establish synchronicity;

determining a first voice quality score for each of a plurality of first voice test messages received by the telephone terminal; and with the voice quality test unit, determining a second voice quality score for each of a plurality of second voice test messages received by the first mobile telephone.

* * * * *